United States Patent [19]

Grover et al.

[11] 3,753,691

[45] Aug. 21, 1973

[54] PROCESS FOR EXTRACTING COPPER FROM SULFIDE ORES

[75] Inventors: Kenneth M. Grover, Pound Ridge, N.Y.; George B. Knecht; John J. Tully, both of Stamford, Conn.

[73] Assignee: Dorr-Oliver Incorporated, Stamford, Conn.

[22] Filed: Jan. 14, 1970

[21] Appl. No.: 2,891

[52] U.S. Cl. .................... 75/101 R, 75/104, 75/109, 75/115, 75/117, 75/121, 204/106, 204/112

[51] Int. Cl. .......................................... C22b 15/08

[58] Field of Search ...................... 75/117, 101, 109, 75/115, 104, 72, 121, 2; 23/175; 204/106, 112

[56] References Cited

UNITED STATES PATENTS

| | | | |
|---|---|---|---|
| 3,634,071 | 1/1972 | Spedden et al. | 75/109 |
| 1,316,351 | 9/1919 | Christensen | 75/117 X |
| 1,395,755 | 11/1921 | Bragg | 75/117 |
| 1,825,752 | 10/1931 | Mott | 75/117 |
| 2,584,700 | 2/1952 | Hayward | 75/109 X |
| 3,169,853 | 2/1965 | van Es | 75/104 X |
| 3,172,725 | 3/1965 | Rugh | 23/175 X |
| 3,348,912 | 10/1967 | Porath et al. | 75/121 X |

*Primary Examiner*—G. T. Ozaki
*Attorney*—T. M. Jablon, Burtsell J. Kearns and Vincent A. Mallare

[57] ABSTRACT

A process for extracting nonferrous metal values from ores by leaching said ores with an aqueous sulphuric acid solution produced by absorbing sulphur trioxide in barren leach liquor coming from hydrometallurgical operations. The process provides wet scrubbing a sulphur dioxide bearing gas, catalytically oxidizing at least a portion of the moisture laden scrubbed sulphur dioxide bearing gas to produce a gas stream containing controlled amounts of sulphur dioxide and sulphur trioxide, absorbing the sulphur trioxide values in barren leach liquor to produce aqueous sulphuric acid for leaching said ores and utilizing said sulphur dioxide values to reduce ferric sulphate to ferrous sulphate present in the pregnant solution resulting from said acidic leaching operation.

10 Claims, 1 Drawing Figure

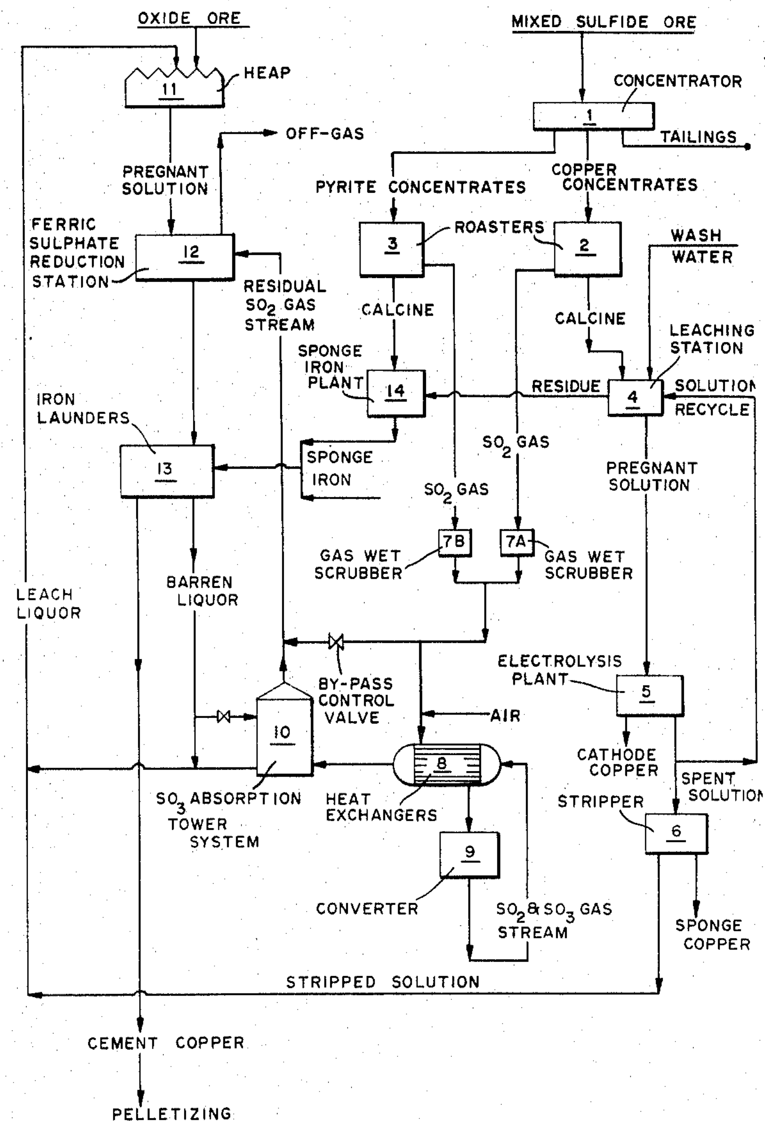

OXIDE ORE
MIXED SULFIDE ORE
HEAP
11
CONCENTRATOR
1
TAILINGS
OFF-GAS
PREGNANT SOLUTION
PYRITE CONCENTRATES
COPPER CONCENTRATES
FERRIC SULPHATE REDUCTION STATION
12
3
ROASTERS
2
WASH WATER
RESIDUAL $SO_2$ GAS STREAM
CALCINE
CALCINE
LEACHING STATION
SPONGE IRON PLANT
14
RESIDUE
4
SOLUTION RECYCLE
IRON LAUNDERS
13
SPONGE IRON
$SO_2$ GAS
$SO_2$ GAS
PREGNANT SOLUTION
7B
7A
GAS WET SCRUBBER
GAS WET SCRUBBER
LEACH LIQUOR
BARREN LIQUOR
ELECTROLYSIS PLANT
5
BY-PASS CONTROL VALVE
AIR
10
8
CATHODE COPPER
SPENT SOLUTION
$SO_3$ ABSORPTION TOWER SYSTEM
HEAT EXCHANGERS
STRIPPER
6
9
CONVERTER
$SO_2$ & $SO_3$ GAS STREAM
SPONGE COPPER
STRIPPED SOLUTION
CEMENT COPPER
PELLETIZING

PATENTED AUG 21 1973
3,753,691
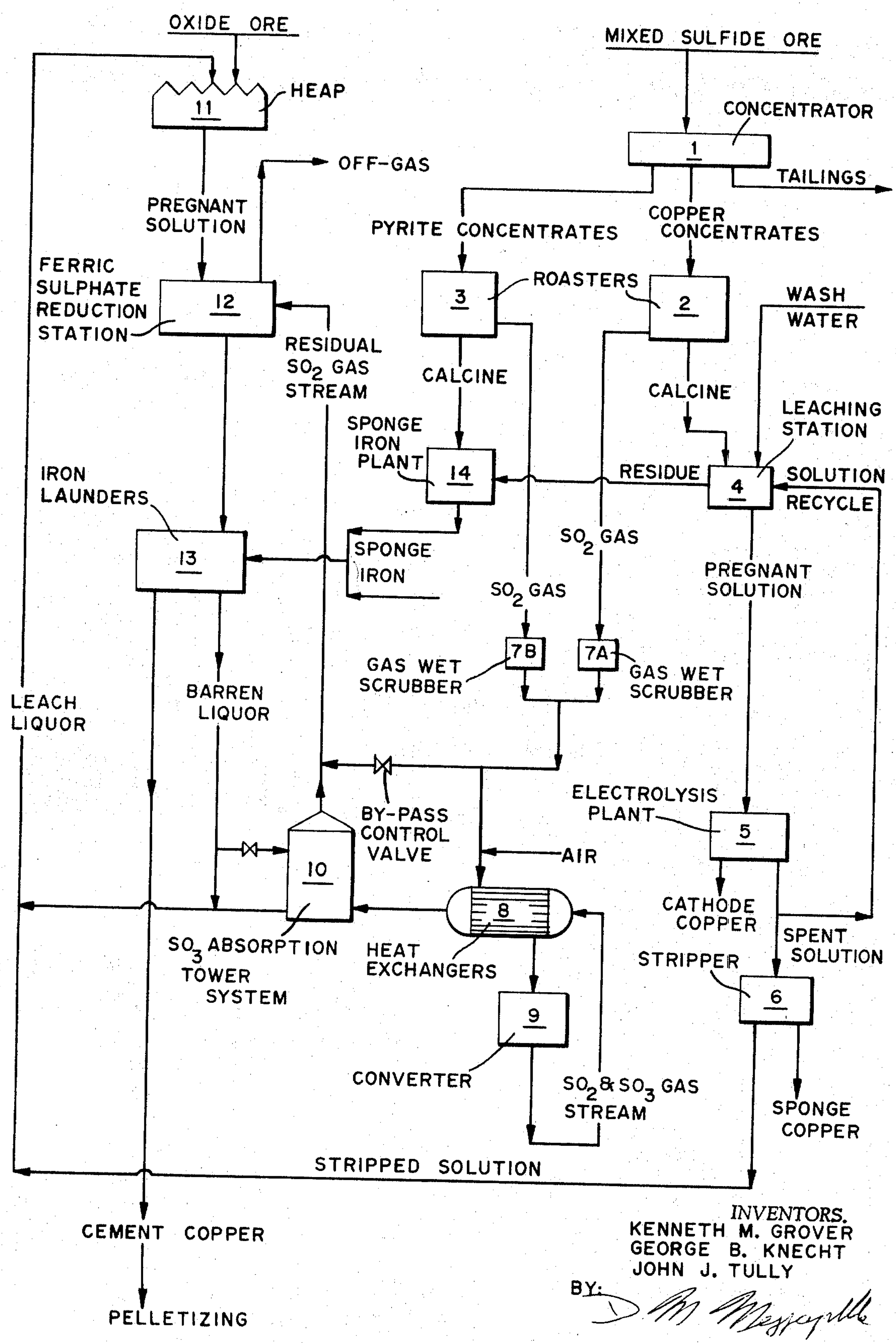
INVENTORS.
KENNETH M. GROVER
GEORGE B. KNECHT
JOHN J. TULLY
BY: [signature]
ATTORNEY.

PROCESS FOR EXTRACTING COPPER FROM SULFIDE ORES

FIELD OF THE INVENITON

This invention relates to a hydrometallurgical process for extracting nonferrous metal values from ores. The process finds particular application in those situations where an oxide ore and a source of sulphur dioxide gas, such as may be generated by the roasting of mineral sulphides, are present.

BACKGROUND

Hydrometallurgical processes for extracting and recovering nonferrous metal values from ores have been commercially practiced for years. In the copper industry, for example, a small but significant amount of the total copper production has been derived from hydrometallurgical operations involving the acid leaching and precipitation of copper from oxide ores.

Even at that, however, due to the high capital investment costs these prior hydrometallurgical processes have not been widely adopted by the industry because the economics of these processes are generally unfavorable when compared to other extractive metallurgical processes.

Recently, due to the expanded markets for copper, the industry has turned to a greater exploitation of oxide ores and low grade ores, such as oxidized copper ores, mixed oxide sulphide ores and those sulphide ores too low in grade to be treated by conventional flotation methods, as a source of copper.

Moreover, quite often, particularly in western United States, deposits are found which contain copper ores in both the sulphide and oxide form. The cutoff between these forms of ores is very often sufficiently distinct so that there is little or no mixed ore. Therefore, the practice has been to separately mine and treat these two classes of ores in parallel metlalurgical plants that operate independent of each other expcept that the sulphuric acid necessary for leaching the oxide form of the ore is produced from the sulphur dioxide derived from roasting the sulphide ore.

Furthermore, as is well known by those skilled in this art, there are many areas in the world where copper occurs only in the oxide form and, in these instances, unless a source of inexpensive sulphuric acid is available, copper can not be extracted by acid leaching on a sound economical basis.

Accordingly, it will be readily apparent that in all of the above situations, a source of inexpensive sulphuric acid is essential to the commercialization and successful exploitation of these operations.

In the past, the acid required for leaching ores was normally produced by the conventional contact sulphuric acid method. In the conventinal contact method, sulphur dioxide bearing gases are frequently produced by burning mineral sulphide ores in a roaster. These gases must be purified before being passed to a converter where the sulphur dioxide is converted to sulphur trioxide in the presence of a suitable catalyst and the resulting sulphur trioxide is subsequently passed to an absorber for production of sulphuric acid.

The purification step typically involves dust removal followed by wet scrubbing, cooling and finally drying. In the conventional plant, the cooling is effected in special waste heat boilers and the drying in a drying tower irrigated with concentrated sulphuric acid. The dry, clean sulphur dioxide bearing gases must then be reheated to conversion temperatures before being passed to the converter. Normally, the dry, clean gases are reheated by indirect heat exchange with the hot oxidized gases leaving the converter. The reheated gases are then passed through several stages of catalysts with cooling between stages to convert substantially all the sulphur dioxide to sulphur trioxide and afterwards cooled to absorption temperatures by passing the converted gases through the aforesaid heat exchanger to heat the incoming relatively cool, clean gases. The thus cooled gases are next sent through an absorption tower wherein the sulphur trioxide is absorbed in concentrated sulphuric acid. The heat evolved in the absorption tower is usually removed by circulating the acid through coolers over which a cooling water stream is passed. The acid thus formed is usually too concentrated to be used in copper leaching so that the acid must be diluted to an acceptable concentration.

From the foregoing, it will be readily apparent that the capital outlay for building a conventional contact sulphuric acid plant involves a major expense which quite often vitiates the advantages and, therefore, the greater utilization of these hydrometallurgical processes. Mreover, in many instances, the high capital costs of converting sulphur dioxide, to concentrated sulphuric acid cannot be justified in view of the marginal grade of the ore and therefore available deposits are not exploited.

It is therefore clear that what the art needs is an inexpensive method of producing sulphuric acid leach liquor for use in hydrometallurgical processes.

SUMMARY OF THE INVENTION

To this end, the invention provides a process for producing hydrometallurgical acid leach liquor in amounts and concentrations sufficient for leaching nonferrous metal values from ores in a more economical and efficient manner than heretofore employed.

The invention is predicated on the discovery that a suitable acid leach liquor may be produced by the process of this invention from sulphur dioxide bearing gases without the necessity of removing water vapor from the gases prior to conversion or producing concentrated sulphuric acid. The invention is also based on the discovery that not all the sulphur dioxide need be converted to sulphur trioxide gas but rather the conversion of sulphur dioxide to sulphur trioxide may be controlled in proportion to the amount of ferric sulphate available for reduction in the subsequent stage of the reaction process.

Thus, the invention eliminates the need for costly drying and acid cooling equipment greatly reduces cost of the converter system. Moreover, the conventional absorption tower and acid cooling coils are replaced with an absorption tower using barren leach liquor for absorbing that portion of the sulphur dioxide which is converted to sulphur trioxide. THe unabsorbed gases containing sulphur dioxide are used in the reduction of ferric sulphate to ferrous sulphate thereby reducing the amount of metallic iron and sulphuric acid consumed in the iron launders.

Further advantages of the process of this invention will become apparent to those skilled in the art from the description of the preferred embodiment and drawings which follow.

BRIEF DESCRIPTION OF THE DRAWINGS

In order that it may be clearly understood and readily carried into effect, the invention will now be described by way of example with reference to the accompanying drawings in which:

the FIGURE is a flow diagram in which the principal steps of the process of this invention are schematically illustrated in conjunction with the treatment of a pyritic copper sulphide ore and a copper oxide ore.

DESCRIPTION OF THE PREFERRED EMBODIMENT

In the drawings, a mixed sulphide ore, for example, chalcopyrite ($CuFeS_2$) and iron sulphide is fed into a conventional flotation concentrator shown at step 1. In the concentrator, the ore is normally first crushed to a product size of about one-fourth inch, ground to a particle size of −35 mesh (Tyler) or finer, and floated to separate a copper concentrate fraction, a pyrite concentrate fraction, and a tailings fraction primarily gangue material, which, for the purpose of this description, may be considered as being discharged to waste.

In step 2, the copper concentrate fraction is subjected to a sulphatization roast with excess air to produce a calcine, comprising mainly copper sulphate, and sulphur dioxide bearing gases according to the general equation:

$$2CuFeS_2 + 7\frac{1}{2}\ O_2 \rightarrow 2CuSO_4 + 2SO_2 + Fe_2O_3$$

In the same manner, the pyrite concentrate fraction is "dead" roasted in the roaster shown as step 3 to form an iron oxide calcine and sulphur dioxide bearing gases as per the equation:

$$2FeS_2 + 5\frac{1}{2}\ O_2 \rightarrow Fe_2O_3 + 4SO_2$$

It is preferred that the roasting operations of steps 2 and 3 be carrid out in fluidized bed reactors because this equipment permits precise control over the operating conditions in the reactors thus for example enabling substantially complete sulphatization of the copper sulphide concentrate.

Following the sulphatization roast, the copper sulphate calcine is treated in a conventional manner in a leaching station shown as step 4 with dilute sulphuric acid to dissolve the copper. Typically, the leaching station includes a series of thickeners in which the calcine is subjected to countercurrent decantation treatment which may be followed by filtration and washing with water of the residue, mainly iron oxide. The pregnant solution from said leaching station containing $CuSO_4$ is thereafter treated in an electrolysis plant shown at step 5 to recover substantially all of the copper as cathode copper. A portion of the spent solution from step 5 containing some copper in dilute sulphuric acid is recycled as the leach liquor to the leaching station of step 4 while the remaining solution is passed through the stripper section shown at step 6, where copper, as sponge copper, is separated. The resulting stripped solution, from step 6, a dilute sulphuric acid solution, forms part of the leach liquor which may be used on the copper oxide heap as will appear more fully hereinafter.

As indicated above, in the roasting operation of steps 2 and 3, sulphur dioxide bearing gases are generated which are treated in accordance with the process of this invention to produce acid leach liquor. The gas streams from steps 2 and 3, are initially treated in hot cyclones, not shown, to remove relatively coarse solid particulate matter normally existing in said roaster gases and the resulting gas streams are thereafter subjected to wet scrubbing, as in steps 7A and 7B, to remove fines.

As shown, it is preferred to separately scrub the gas streams coming from steps 2 and 3 because of the difference in temperature of the two gas streams and also because the gases coming from the copper concentrate roaster contain copper sulphate fines which may be recovered and conveniently treated in the aforesaid leaching station, whereas the gas streams from the pyrite roaster contain iron oxide fines which may be recovered and forwarded to the sponge iron plant, to be referred to hereinafter.

In any event, the clean moisture laden gas streams are thereafter combined and mixed with a predetermined amount of oxygen containing gas before being passed through a heat exchanger station shown at step 8. In the heat exchanger, the sulphur dioxide bearing gas mixture is heated by indirect heat exchange with previously converted gas to a temperature suitable for catalytic conversion of the sulphur dioxide to sulphur trioxide. This temperature may vary from 750°F. to 1,100°F. depending on the strength of the sulphur dioxide in the original gas and the required final gas composition. This gas then passes through a converter system shown at step 9, containing any commercially acceptable catalyst, such as vanadium pentoxide or iron oxide.

Normally, only one converter pass is requird when the process of this invention is applied to leach-cementation production, compared to several passes required in the heretofore conventional process because the required degree of conversion for the process of this invention is less than that required in conventional plants. However, whenever a minimum of sulphur dioxide is required in the resulting gas stream more than one stage of conversion may be employed.

The gas stream issuing from the converter of step 9 and containing principally sulphur dioxide, sulphur trioxide and water vapor is initially passed through the heat exchange station of step 8 to heat the incoming sulphur dioxide bearing gas stream and, thereafter, said gas stream is introduced into the absorption tower system of step 10 for absorption of the sulphur trioxide.

In contrast to the prior art, however, the sulphur trioxide absorption tower is irrigated with barren leach liquor coming from the iron launders to produce a weak sulphuric acid solution which is suitable for use as leach liquor. Single or multistage absorption may be employed at step 10 depending on the sulphuric acid strength desired in the product stream.

The resulting acidic product stream from step 10 is fed into the barren liquor recycle stream and used as leach liquor on the oxide ore heap at step 11 for leaching the copper values from said ore. The residual sulphur dioxide in the gas stream leaving said absorption tower system is, in accordance with this invention, sent to the ferric sulphate reduction station of step 12.

The quantity of sulphur dioxide in the gas stream to the ferric sulphate reduction station is controlled so that the amount of sulphur dioxide available in said stream will conform to the quantity of ferric sulphate available for reduction to ferrous sulphate. Several methods of controlling the amount of sulphur dioxide in said residual sulphur dioxide gas stream are possible.

These controls may be used alone or in combination and consists of:

a. by-passing a certain volume of sulphur dioxide bearing gas from the upstream side of the converter to the downstream side. As shown in the drawings, a bleed-off stream is provided between the stream carrying moisture laden sulphur dioxide gas and the residual sulphur dioxide gas stream. A control valve in said bleed-off stream regulates the amount of sulphur dioxide bearing gases by-passing the converter. Moreover, it will be seen, that this bleed-off is effected prior to the addition of the oxygen bearing gas. While it is indeed possible to effect such a bleed-off at a point subsequent to the addition of the oxygen bearing gas, this is not preferred since in the latter instance the oxygen bearing gas must unnecessarily be carried through the reaction system and, moreover, said oxygen bearing gas in the residual gas stream acts as a diluent in said stream and, further, counteracts the reduction of ferric sulphate to ferrous sulphate.
b. varying the inlet gas temperature to the converter to select the desired conversion point and rate of reaction, and
c. varying the ratio of oxygen to sulphur dioxide in the gas entering the converter by controlling the amount of oxygen bearing gas added to the sulphur dioxide bearing gas stream to thereby set the equilibrium conversion conditions.

The method or methods selected for controlling the amount of sulphur dioxide in said residual sulphur dioxide gas stream depends on whether all or part of the sulphur dioxide gas produced in the roasters of steps 2 and 3 goes into the converter of step 9.

In the situation where all the sulphur dioxide gas from the roasters goes into the converter then the control may be effected by the methods *b* and/or *c*.

In the situation where only part of the sulphur dioxide gas from the roaster goes into the converter then the control will depend on, firstly, how the converter is operated, mainly, control methods *b* and/or *c* and, secondly, how much gas is by-passed around the converter, mainly, control method *a*.

As indicated above, the ore heap is shown at step 11 and contains a porous copper oxide ore, for example, chryscolla, which is crushed to a suitable size and carefully placed on a prepared surface. The heap is sprayed with leach liquor, a dilute sulphuric acid solution, which, in accordance with this invention, comprises recycled barren liquor coming from the iron precipitation launders, dilute sulphuric acid solution produced in step 10, and stripped solution from the stripper section of step 6.

The resulting copper bearing pregnant solution containing ferric iron, coming from the oxide ore heap is initially treated with the residual sulphur dioxide gas stream in the ferric sulphate reduction station to reduce ferric sulphate to ferrous sulphate.

Thus, in accordance with this invention, parasitic ferric iron, present as ferric sulphate in the pregnant solution, is reduced by the sulphur dioxide in the residual gas stream to ferrous iron prior to precipitation of cement copper in the iron launders of step 13. The use of sulphur dioxide gas for reaction with ferric sulphate will reduce the quantity of iron acid consumed during cement copper production. Furthermore, the reduction of ferric sulphate to ferrous sulphate in the reduction station produces by product sulphuric acid which is recovered in the barren liquor and is advantageously used as leach liquor on the oxide ore heap of step 11.

After reduction of the ferric iron the pregnant solution from step 12 is introduced into conventional iron precipitation launders shown at step 13 where metallic iron precipitates copper from solution by the well known reaction:

$$CuSO_4 + Fe \rightarrow Cu + FeSO_4$$

Any source of iron may be used for precipitating the copper, for example, it is well known to use shredded scrapped cans and heavy scrap iron. However, in accordance with the preferred embodiment of this invention, sponge iron is used as the source of metallic iron. The sponge iron may be produced in a sponge iron plant, shown as step 14, using the iron oxide calcine coming from the pyrite concentrate roaster of step 3 and the washed iron oxide residue from the leaching station of step 4.

Additional sponge iron may be added to the iron launders as required.

EXAMPLE

The invention will be further described, with reference to the following example which illustrates the operation of the preferred embodiment of this invention.

A copper concentrate containing:

| | |
|---|---|
| Cu | 26% |
| Fe | 31% |
| S | 36% |

was fed into the roaster of step 2 at a rate of 728 lbs. per minute to produce a stack gas having the following composition:

| Constituents | Mol %, Wet Basis |
|---|---|
| $SO_2$ | 4.3 |
| $SO_3$ | 0.4 |
| $O_2$ | 4.3 |

In the same manner, a pyrite concentrate containing

| | |
|---|---|
| Fe | 44% |
| S | 50% |

was fed into the roaster of step 3 at a rate of 290 lbs. per minute to produce a stack gas having the following composition:

| Constituents | Mol %, Wet Basis |
|---|---|
| $SO_2$ | 12.5 |
| $O_2$ | 0.4 |

The stack gases from said roaster were separately treated in hot cyclones followed by scrubbing in the wet scrubbers of steps 7A and 7B and thereafter combined.

The combined moisture laden $SO_2$ bearing gas stream had a flow rate of 86,800 SCFM (standard cubic feet per minute) and a temperture of 182°F. The gas contained the following:

| Constituents | Mol %, Wet Basis |
|---|---|
| $SO_2$ | 3.9 |
| $SO_3$ | 0.2 |
| $O_2$ | 2.0 |
| $H_2O$ | 54.3 |

In accordance with this invention, a by-pass stream around the converter was established and this stream was controlled to bleed moisture laden sulphur dioxide bearing gases from said combined gas stream to the residual sulphur dioxide gas stream at a flow rate of 48,600 SCFM. Air was added to the remaining gas stream and the resulting mixture entered the heat exchange section of step 8 at a flow rate of 43,500 SCFM. The inlet temperature of the mixed gas stream was 170°F. and contained the following:

| Constituents | Mol %, Wet Basis |
|---|---|
| $SO_2$ | 3.4 |
| $SO_3$ | 0.2 |
| $O_2$ | 4.3 |

After passing through the converter of step 9 and heat exchange section of step 8 the converter gas stream entered the absorption tower of step 10. The inlet temperature of gas stream to the absorption tower was at 315°F. and this gas stream contained the following:

| Constituents | Mol %, Wet Basis |
|---|---|
| $SO_2$ | 0.8 |
| $SO_3$ | 2.9 |
| $O_2$ | 3.0 |

In the absorption tower, the catalytically converted sulphur trioxide from the converter was absorbed in barren liquor coming from the iron launders. The barren liquor was fed into the absorption tower at the rate of 825 GPM (gallons per minute) and contained the following:

| | |
|---|---|
| Cu | 0.2 g/liter |
| $Fe^{++}$ | 18.2 g/liter |
| Free $H_2SO_4$ | 12.6 g/liter |

The resulting acidic product stream after absorption of the sulphur trioxide, contained 61 grams of free $H_2SO_4$ per liter corresponding to 424 lbs. free $H_2SO_4$ per minute. The acidic product stream was combined with the remaining barren liquor stream coming from said iron launders and the combined stream at a flow rate of 11,800 GPM was used to form part of the leach liquor on the oxide ore heap at step 11. The combined acidic product stream and barren liquor stream contained the following:

| | |
|---|---|
| Cu | 0.2 g/liter |
| Fe | 17.9 g/liter |
| Free $H_2SO_4$ | 15.8 g/liter |

The balance of said leach liquor for said heap was made up by adding 325 GPM of stripped solution from the stripper section of step 6 and containing:

| | |
|---|---|
| Cu | 1.0 g/liter |
| Fe | 2.5 g/liter |
| Free $H_2SO_4$ | 104 g/liter |

The resulting copper bearing pregnant solution was recovered from the ore heap at a rate of 11,600 GPM and contained the following:

| | |
|---|---|
| Cu | 2.0 g/liter |
| $Fe^{++}$ | 7.5 g/liter |
| $Fe^{+++}$ | 7.5 g/liter |
| Free $H_2SO_4$ | 3.0 g/liter |

In accordance with this invention, the pregnant solution was initially treated in the ferric sulphate reduction station of step 12 with the residual sulphur dioxide gas stream coming from the sulphur trioxide absorption tower system of step 10 and to which was added the bypass stream.

The residual sulphur dioxide gas stream was fed into the reduction station of step 12 at the rate of 88,200 SCFM. This stream contained the following:

| Constituents | Mol %, Wet Basis |
|---|---|
| $SO_2$ | 2.5 |
| $SO_3$ | 0.1 |
| $O_2$ | 2.6 |

The off gas from the reduction station of step 12 contained 0.03 mol % sulphur dioxide (wet basis). This value may vary considerably depending on the design and operating conditions in said reduction station.

After reduction of the ferric iron, the pregnant solution contained the following:

| | |
|---|---|
| Cu | 2.0 g/liter |
| $Fe^{++}$ | 14.3 g/liter |
| $Fe^{+++}$ | 0.75 g/liter |
| Free $H_2SO_4$ | 14.9 g/liter |

This stream was fed into the iron precipitation launders with the resulting production of 174 lbs. per minute of cement copper.

The system also produced 145 lbs. per minute of cathode copper and 38 lbs. per minute of sponge copper.

In this example, standard cubic feet refers to cubic feet of gas meansured at 1 atmosphere absolute and 0°C.

We claim:

1. A hydrometallurgical process for extracting copper values from copper oxide ores by leaching said ores with an aqueous sulfuric acid solution, which comprises the steps of providing a supply of sulfur dioxide bearing gases, said gases containing solid particulate matter, subjecting said sulfur dioxide bearing gases to wet scrubbing to cleanse said gases of said solid particulate matter, mixing a predetermined amount of oxygen containing gases with the cleansed moisture-laden sulfur dioxide bearing gases, maintaining the temperature of said moisture-laden mixed gases within the range of from 750°F to 1,100°F, catalytically oxidizing at least a portion of said sulfur dioxide to sulfur trioxide to produce a first gas stream containing sulfur dioxide and sulfur trioxide, absorbing the thus formed sulfur trioxide in barren leach liquor resulting from the leaching of said non-ferrous metal values to produce an aqueous sulfuric acid solution and a second gas stream containing residual sulfur dioxide, leaching said ores with the thus produced sulfuric acid solution to produce a pregnant solution of metal values solubilized from said ores including ferric sulfate, treating said pregnant solution with said sulfur dioxide in said second gas stream to reduce said ferric sulfate to aqueous ferrous sulfate, while producing aqueous sulfuric acid as a result of this reaction, controlling the ratio of sulfur dioxide to sulfur trioxide in said first gas stream so that the amount of sulfur dioxide available after absorption of said sulfur trioxide is sufficient to reduce substantially all of said ferric sulfate to ferrous sulfate, and recovering the copper values from the sulfur dioxide treated pregnant solution by reaction with metallic iron.

2. The process according to claim 1, wherein said supply of sulfur dioxide bearing gases is provided by the roasting of a mineral sulfide producing a calcine and sulfur dioxide bearing gases.

3. The process according to claim 2, wherein said mineral sulfide comprises a mixed iron sulfide and copper sulfide ore.

4. The process according to claim 2, wherein said mineral sulfide comprises a mixed iron sulfide and copper sulfide ore, wherein said mixed ore is treated to separate an iron sulfide concentrate from an iron containing copper sulfide concentrate, and wherein at least one of said sulfide concentrates is subjected to roasting to provide said sulfur dioxide bearing gases.

5. The preocess according to claim 4, wherein said concentrates are roasted separately in the presence of excess oxygen to produce respectively calcines of iron oxide and of copper sulfate.

6. The process according to claim 4, wherein the copper sulfate calcine is leached with a dilute sulfuric acid solution to produce a copper sulfate solution and an iron oxide residue, and wherein said residue is converted into sponge iron adapted for precipitating copper from the sulfur diosxide treated pregnant solution that has resulted from the leaching of the copper oxide ore.

7. The process according to claim 4, wherein the copper sulfate calcine is leached with dilute sulfuric acid solution to produce copper sulfate solution, wherein the copper sulfate solution is subjected to electrolysis to recover the copper as cathode copper, wherein a portion of the partially spent solution resulting from said electrolysis is recycled to dissolve said copper sulfate, and wherein the remaining portion of said partially spent solution is stripped and then used in the leaching of said copper oxide ores.

8. The process according to claim 4, wherein each of said concentrates is subjected to a roasting operation producing $SO_2$-bearing gases, and the gases from the respective roasting operations are cleansed of solid particulate matter, each in a separate cleansing operation.

9. The process according to claim 4, wherein said iron sulfide concentrate is roasted in the presence of excess oxygen to produce a calcine of iron oxide, wherein sponge iron is produced from said iron oxide, adapted for precipitating copper from the sulfur dioxide treated pregnant solution that has resulted from the leaching of the copper oxide ore.

10. A hydrometallurgical process for extracting copper values from copper oxide ores by leaching said ores with an aqueous sulfuric acid solution, which comprises the steps of providing a supply of sulfur dioxide bearing gases, said gases containing solid particulate matter, the said sulfur dioxide-bearing gases being gases being produced as a byproduct of the roasting of a mixed iron sulfide and copper sulfide ore wherein the said sulfide ores are separated and separately roasted in the presence of excess oxygen to produce calcines of iron oxide and copper sulfate and sulfur-dioxide bearing gases, subjecting said sulfur dioxide bearing gases to wet scrubbing to cleanse said gases of said solid particulate matter, mixing a predetermined amount of oxygen-containing gases with the cleansed moisture-laden sulfur dioxide-bearing gases, maintaining the temperature of said moisture-laden mixed gases within the range of from 750°F to 1100°F, catalytically oxidizing at least a portion of said sulfur dioxide to sulfur trioxide to produce a first gas stream containing sulfur dioxide and sulfur trioxide, absorbing the thus formed sulfur trioxide in barren leach liquor resulting from the leaching of said non-ferrous metal values to produce an aqueous sulfuric acid solution and a second gas stream containing residual sulfur dioxide, leaching said ores with the thus produced sulfuric acid solution to produce a pregnant solution of metal values solubilized from said ores including ferric sulfate, treating said pregnant solution with said sulfur dioxide in said second gas stream to reduce said ferric sulfate to aqueous ferrous sulfate while producing aqueous sulfuric acid as a result of this reaction, controlling the ratio of sulfur dioxide to sulfur trioxide in said first gas stream so that the amount of sulfur dioxide available after absorption of said sulfur trioxide is sufficient to reduce substantially all of said ferric sulfate to ferrous sulfate, and recovering the copper values from sulfur dioxide treated pregnant solution by reaction with metallic iron.

* * * * *